April 21, 1931. P. H. KNOWLES 1,801,672
CULINARY UTENSIL
Filed March 15, 1930
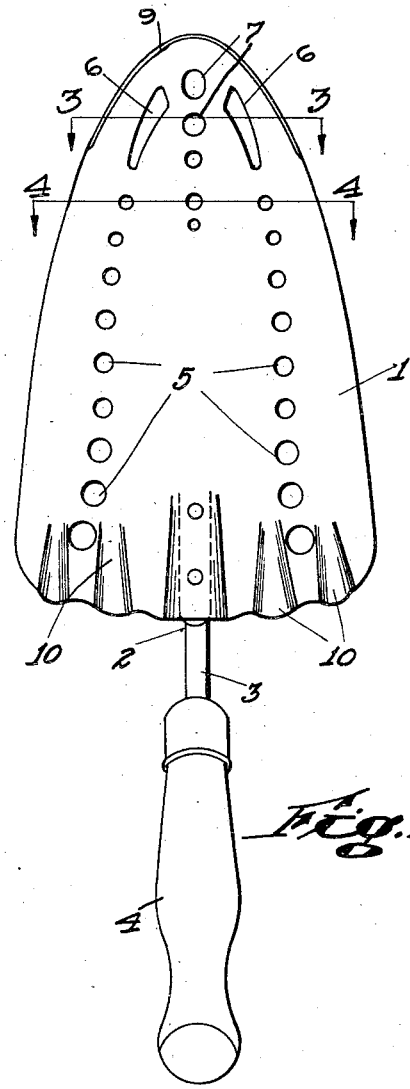
Fig.1.
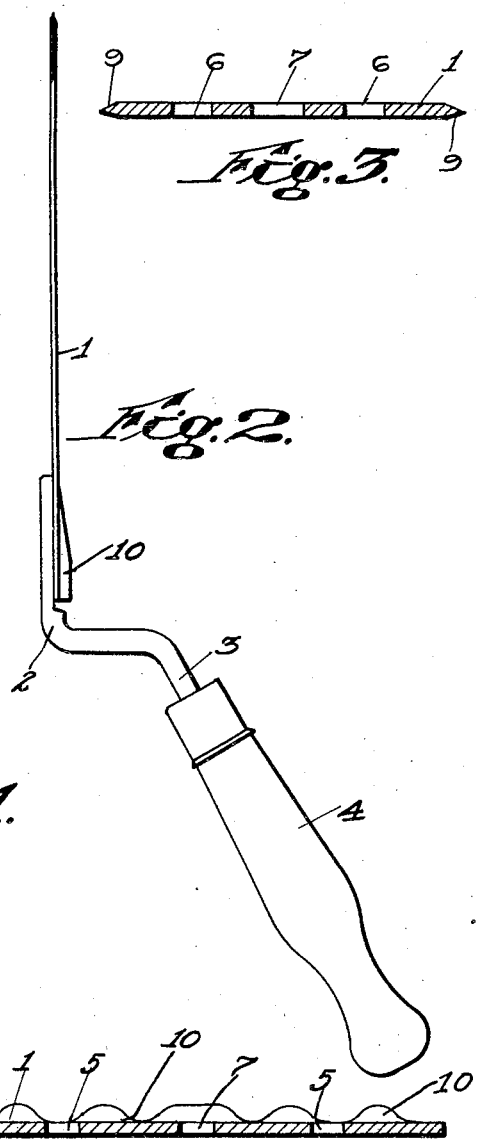
Fig.3.
Fig.2.
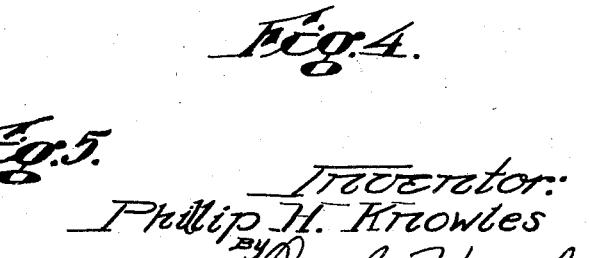
Fig.4.
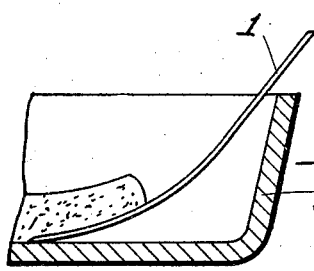
Fig.5.
Inventor:
Phillip H. Knowles
By Owen A. Kennedy
Attorney Patented Apr. 21, 1931

1,801,672

UNITED STATES PATENT OFFICE

PHILLIP H. KNOWLES, OF CHICAGO, ILLINOIS, ASSIGNOR TO THE WASHBURN COMPANY, OF WORCESTER, MASSACHUSETTS, A CORPORATION OF MASSACHUSETTS

CULINARY UTENSIL

Application filed March 15, 1930. Serial No. 436,226.

The present invention relates to culinary utensils and has particular reference to utensils of the type commonly known as cake turners or pie knives. One object of the invention is to provide a utensil of the above indicated type that is characterized by the provision of a blade having an extremely flexible end portion, the edge of which is sharpened so that it may readily be forced under a cake, pie, or other flat article of food. Another object of the invention is to provide a utensil that may be employed for crimping pastry, such as pies. The above and other advantageous features of the invention will hereinafter more fully appear with reference to the accompanying drawings, in which—

Fig. 1 is a plan view of the utensil.

Fig. 2 is a view in side elevation of the utensil shown in Fig. 1.

Fig 3 is an enlarged sectional view along the line 3—3 of Fig. 1 looking in the direction of the arrows.

Fig. 4 is an enlarged sectional view along the line 4—4 of Fig. 1.

Fig. 5 is a fragmentary view illustrating the use of the utensil.

Like reference characters refer to like parts in the different figures.

Referring to the drawings, the utensil comprises a blade 1 of elongated wedge shaped form with rounded corners, the base of the blade having attached thereto a stiff metal bracket 2 bent substantially at right angles to the blade 1 and then rearwardly at an acute angle to provide a shank portion 3 on which is mounted a suitable handle 4, preferably of wood.

The blade 1 is provided with series of perforations 5, 5 along the converging edges thereof, and at the tip of the blade 1 there are provided spaced elongated openings 6, 6 of considerably greater area than any of the perforations 5, which decrease in size as they approach the elongated openings 6. In addition that portion of the blade between the elongated openings 6, 6 is provided with a single series of perforations 7, 7 which decrease in size as they approach the side perforations 5, 5.

As a result of the above described arrangement of openings 6 and perforations 7 the pointed end portion of the blade 1 is extremely flexible due to the considerable portion of metal removed, as indicated in Fig. 3. The effect of this flexibility is also increased by the fact that along the section 4—4 a comparatively small amount of metal has been removed, since the perforations 5 and 7 decrease in size at this point. As a result, pressure applied at a point of the blade causes ready flexure thereof without appreciably bending that portion of the blade 1 between the handle and the section line 4—4. On account of this extreme flexibility, it is possible to readily insert the point of the blade under any article which tends to adhere to the flat surface of a cooking utensil, as for example a pancake. This flexure is indicated in Fig. 5 which shows only a portion of the utensil in connection with a portion of a frying pan 8.

In order to further increase the adaptability of the utensil for lifting flat articles of food which have stuck to a hot surface, the edges of the blade 1 on opposite sides of the elongated openings 6 are ground, as indicated at 9 in Fig. 3, so that the blade 1 provides a relatively sharp edge at the place where it is most needed to loosen an article. The ground edge 9 only extends around that portion of the blade that possesses the greatest flexibility, the edges being square along the section line 4—4.

In order to adapt the utensil for crimping the edges of sheets of pastry, as in pie making, the base of the blade 1 is provided with a series of rounded corrugations 10, generally tapering in form. As clearly shown in Figs. 1 and 4, the corrugations 10 extend along the rear edge of the blade 1, with the portion 2 of the handle 4 seated in one of the depressions. Obviously, the corrugations 10 provide means for readily crimping a soft sheet of dough, the offset handle permitting the corrugations 10 to be applied directly to the flat dough sheet, without the hand of the user coming in contact with the pastry. Furthermore, the corrugations 10 serve to stiffen the base of the blade at its point of attachment to the handle 4, thereby increasing the relative flexibility of the pointed portion of the blade.

From the foregoing then it is apparent that by the present invention there is provided an improved utensil that is particularly adapted for separating and lifting flat articles of food, such as pancakes or pies, which tend to adhere to the cooking surface, the extreme flexibility and sharpness of the blade permitting it to be readily forced under any article. Furthermore, the utensil is also very useful for crimping the edges of sheets of pastry, as in pie making.

I claim:

1. A culinary utensil comprising a flat wedge-shaped blade with its pointed end portion having perforations therein to increase its flexibility, as compared to the remainder of said blade.

2. A culinary utensil comprising a flat wedge-shaped blade having its pointed end rendered flexible by the provision of perforations therein and with a series of stiffening corrugations extending along its base on opposite sides of an offset handle attached to said blade.

3. A culinary utensil comprising a flat wedge-shaped blade having a series of perforations therefor, with said perforations increasing in size toward the pointed end portion of said blade to increase the flexibility of the end portion, as compared to the remainder of said blade.

4. A culinary utensil comprising a flat wedge-shaped blade having a series of perforations therefor, with said perforations increasing in size toward the pointed end portion of said blade to increase the flexibility of the end portion, as compared to the remainder thereof, and with the base of said blade providing corrugations to stiffen the same on opposite sides of the point of attachment of a handle.

PHILLIP H. KNOWLES.